US009061806B2

(12) United States Patent
Gao et al.

(10) Patent No.: US 9,061,806 B2
(45) Date of Patent: Jun. 23, 2015

(54) CABLE TIES EMPLOYING A NYLON/GRAPHENE COMPOSITE

(71) Applicant: Thomas & Betts International, Inc., Wilmington, DE (US)

(72) Inventors: Yan Gao, Memphis, TN (US); Cong T Dinh, Collierville, TN (US); Mark R Drane, Germantown, TN (US); Alan D Neal, Germantown, TN (US)

(73) Assignee: Thomas & Betts International, LLC, Wilmington, DE (US)

( * ) Notice: Subject to any disclaimer, the term of this patent is extended or adjusted under 35 U.S.C. 154(b) by 157 days.

(21) Appl. No.: 13/786,697

(22) Filed: Mar. 6, 2013

(65) Prior Publication Data

US 2014/0059809 A1  Mar. 6, 2014

Related U.S. Application Data

(60) Provisional application No. 61/694,966, filed on Aug. 30, 2012.

(51) Int. Cl.
| | |
|---|---|
| *B65D 63/10* | (2006.01) |
| *C08L 77/06* | (2006.01) |
| *C08L 77/02* | (2006.01) |
| *C08K 9/00* | (2006.01) |
| *C08K 3/04* | (2006.01) |
| *B29D 5/00* | (2006.01) |

(52) U.S. Cl.
CPC ............. *B65D 63/10* (2013.01); *Y10T 24/1498* (2015.01); *B29D 5/00* (2013.01)

(58) Field of Classification Search
CPC ................... B65D 63/1081; C01B 31/1043
See application file for complete search history.

(56) References Cited

U.S. PATENT DOCUMENTS

| | | | | |
|---|---|---|---|---|
| 4,003,106 | A * | 1/1977 | Schumacher et al. | 24/16 PB |
| 5,295,285 | A * | 3/1994 | Shely | 24/16 PB |
| 5,732,448 | A * | 3/1998 | Shields et al. | 24/180 |
| 5,797,404 | A * | 8/1998 | Stanchin, II | 128/869 |
| 6,497,258 | B1 * | 12/2002 | Flannery et al. | 140/123.6 |
| 6,528,572 | B1 | 3/2003 | Patel | |
| 7,871,693 | B2 * | 1/2011 | Laporte et al. | 428/212 |
| 2005/0222376 | A1 * | 10/2005 | Sassi et al. | 528/310 |
| 2006/0231792 | A1 | 10/2006 | Drzal et al. | |
| 2007/0092432 | A1 * | 4/2007 | Prud'Homme et al. | 423/448 |
| 2007/0226960 | A1 * | 10/2007 | Laporte et al. | 24/16 PB |
| 2007/0234525 | A1 * | 10/2007 | Laporte et al. | 24/16 PB |
| 2008/0170982 | A1 * | 7/2008 | Zhang et al. | 423/447.3 |
| 2009/0235494 | A1 * | 9/2009 | Browne et al. | 24/16 R |
| 2009/0294736 | A1 * | 12/2009 | Burton et al. | 252/511 |
| 2010/0096597 | A1 * | 4/2010 | Prud'Homme et al. | 252/511 |
| 2010/0125113 | A1 * | 5/2010 | Xiao et al. | 523/468 |

(Continued)

FOREIGN PATENT DOCUMENTS

| | | |
|---|---|---|
| JP | H10-204290 A | 8/1998 |
| JP | 2008-150400 A | 7/2008 |

(Continued)

OTHER PUBLICATIONS

Extended European Search Report of EP 13181754, dated Dec. 12, 2013.

*Primary Examiner* — Robert J Sandy
*Assistant Examiner* — David Upchurch
(74) *Attorney, Agent, or Firm* — Hoffmann & Baron, LLP

(57) ABSTRACT

Cable ties employing a nylon/graphene composite.

18 Claims, 1 Drawing Sheet

(56) References Cited

U.S. PATENT DOCUMENTS

| | | |
|---|---|---|
| 2010/0146742 A1 | 6/2010 | Every |
| 2010/0190100 A1* | 7/2010 | Kelly et al. .................. 430/84 |
| 2010/0229608 A1* | 9/2010 | Dapkins et al. ................ 70/16 |
| 2010/0317790 A1* | 12/2010 | Jang et al. .................. 524/496 |
| 2011/0046289 A1* | 2/2011 | Zhamu et al. ................ 524/495 |
| 2011/0114897 A1* | 5/2011 | Aksay et al. ................ 252/511 |
| 2011/0117361 A1* | 5/2011 | Hamilton et al. ............ 428/333 |
| 2011/0186789 A1* | 8/2011 | Samulski et al. ............ 252/514 |
| 2011/0256376 A1* | 10/2011 | Compton et al. ............. 428/220 |
| 2011/0260116 A1* | 10/2011 | Plee et al. ................... 252/511 |
| 2011/0303121 A1* | 12/2011 | Geim et al. ............. 106/287.28 |
| 2011/0315934 A1* | 12/2011 | Ma et al. .................... 252/511 |
| 2011/0319554 A1* | 12/2011 | Frazier et al. ................ 524/577 |
| 2012/0010339 A1* | 1/2012 | Xie et al. .................... 524/251 |
| 2012/0065311 A1 | 3/2012 | Chakraborty et al. |
| 2012/0103535 A1* | 5/2012 | Cruz .......................... 156/704 |
| 2012/0266419 A1* | 10/2012 | Browne et al. ............. 24/20 EE |

FOREIGN PATENT DOCUMENTS

| | | |
|---|---|---|
| JP | 2010-506014 A | 2/2010 |
| WO | 2008/045778 A1 | 4/2008 |
| WO | 2009/014857 A1 | 1/2009 |
| WO | 2011/032221 A1 | 3/2011 |
| WO | 2011/120008 A1 | 9/2011 |
| WO | 2012/029946 A1 | 3/2012 |

* cited by examiner

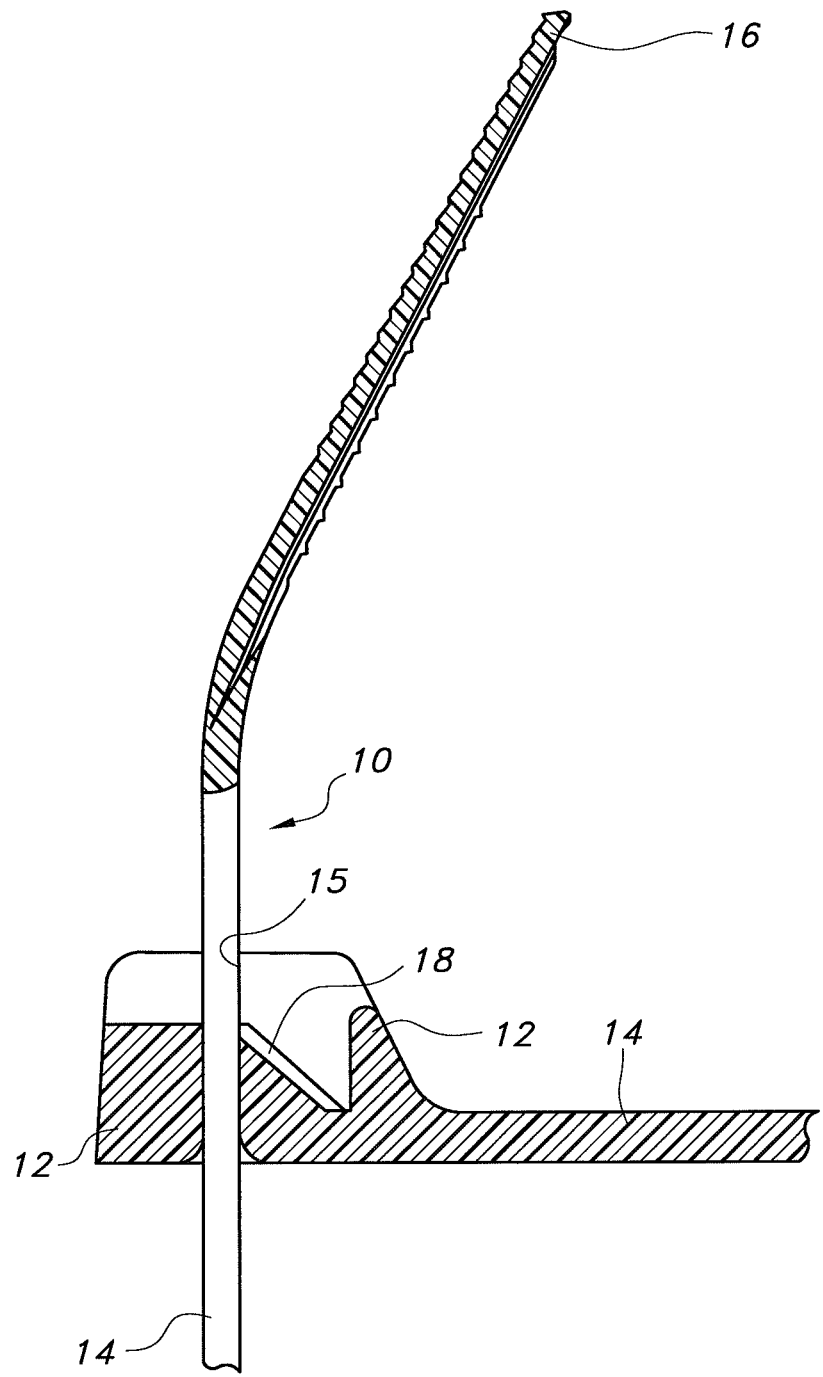

US 9,061,806 B2

CABLE TIES EMPLOYING A NYLON/GRAPHENE COMPOSITE

CROSS-REFERENCE TO RELATED APPLICATION

This application claims the benefit of U.S. Provisional Application No. 61/694,966, filed Aug. 30, 2012, the contents of which are incorporated by reference herein.

FIELD OF THE INVENTION

The present invention relates to cable ties having improved mechanical strength. More particularly, the present invention is directed to cable ties employing a nylon/graphene composite.

BACKGROUND OF THE INVENTION

Cable ties are well known and may be used to bundle or secure a group of articles such as electrical wires or cables. Typically, cable ties include a head, and elongate tail and a longitudinal strap therebetween. The head of the cable tie includes a locking element which is engageable with the strap to secure the strap in the head.

There are generally two types of cable ties. The first is a one-piece cable tie. The one-piece tie is integrally formed of plastic material, preferably nylon, and uses a molded pawl inside the head and a formed teeth array in the strap body to secure the strap in the tail. The second is a two-piece cable tie. The two-piece tie has a nylon head and strap body. A stainless steel barb is embedded in the head which digs into the strap to secure the strap in the body.

Performance of a cable tie is measured by insertion force, i.e., how much force is required to insert the strap into the head. Cable tie performance is also measured by its tension force. Generally, cables ties are categorized by their holding tension force (e.g., 18 lbs, 50 lbs and 120 lbs). The maximum break limit of a cable tie is about 150% of its maximum rated holding tension force.

In addition to having a desirable tension force, desirably, a cable tie has sufficient elongation to not only bundle objects effectively but to withstand additional forces that are exerted due to environmental conditions (e.g., ice). Unfortunately, cable ties made of nylon 6,6 matrix provide limited mechanical strength limits due to the material limits of the nylon 6,6 material which is an impediment to achieving higher performance.

Thus, there is a need for cable ties which have improved holding tension force and/or elongation.

SUMMARY OF THE INVENTION

The present invention provides cable ties including a composite of nylon and graphene as well as methods of making such cable ties. Advantageously, such cable ties not only have an increased holding tension force but have increased elongation compared to a cable tie formed with matrix nylon 6,6. As such, the improved cable ties are more readily able to hold a bundle and withstand added forces as occur due to environmental conditions.

BRIEF DESCRIPTION OF THE FIGURE

FIG. 1 shows, in section, the cable tie of the present invention, having a cable tie head and extending strap, with the strap inserted into the head.

DETAILED DESCRIPTION OF THE INVENTION

Referring to FIG. 1, a cable tie 10 of the present invention is shown. Cable tie 10 is typically an elongate molded plastic member which is used in a manner well known in the art to wrap around a bundle of articles such as electrical wire or cable (not shown). Cable tie 10 including a composite of a polymer and graphene is suitable for both indoor and outdoor use. Cable tie 10 has a head 12 at one end thereof, a tail 16 at the other end of the head 12 and a generally planar strap 14 therebetween. In the illustrative embodiment provided, head 12 is formed as an integral portion of cable tie 10. However, in certain applications cable tie 10 may be constructed in a manner where head 12 is formed separately from strap 14.

Head 12 of cable tie 10 includes an aperture 15 therethrough (shown with strap 14 therein) for insertably accommodating the tail 16 and passage of the strap 14 therein in a first direction "A". Head 12 of cable tie 10 includes a locking device 18 supported by the head 12 and extending into the aperture. The locking device permits movement of the strap 14 in the first direction "A" and prevents substantial movement of the strap 14 in a second direction "B" opposite the first direction upon an attempt to withdraw the strap 14 from the aperture. The locking device may include a metallic barb such as shown in U.S. Pat. No. 5,513,421; or an integrally formed plastic pawl such as shown in U.S. Pat. No. 7,017,237.

In contrast to traditional cable ties formed from polymer (e.g., nylon 6,6) alone, the present invention provides cable ties including additionally a composite of a polymer and graphene. In one embodiment of the composite, the polymer is nylon. More specifically, the polymer is nylon 6 and the graphene is chemically functionalized. Preferably, the composite includes graphene in an amount between 1 wt % and 20 wt %.

In one embodiment, the cable tie of the present invention includes nylon 6,6 resin and in addition a composite of a polymer and graphene. Preferably, the nylon 6,6 resin is a commercial nylon 6,6 grade. In preferred embodiments, the overall amount of graphene present in the cable tie is between 0.01 wt % and 5 wt %. In one preferred embodiment, graphene is present in the cable tie in an amount no greater than 1 wt %.

In one embodiment, the cable tie exhibits an elongation of 20% or greater. In one embodiment, the cable tie exhibits an increase in tensile strength of 20% or greater compared with a cable tie formed of matrix nylon 6,6. In one embodiment, the cable tie exhibits an increase in tensile strength of 30% or greater compared with a cable tie formed of matrix nylon 6,6. In certain embodiments, the cable tie exhibits both (i) an elongation of 20% or greater and (ii) an increase in tensile strength of 20% or greater compared with a cable tie formed of matrix nylon 6,6. In certain embodiments, the cable tie exhibits both (i) an elongation of 20% or greater and (ii) an increase in tensile strength of 30% or greater compared with a cable tie formed of matrix nylon 6,6.

In general, methods of preparing cable ties are provided which include (a) compounding technology that synthesizes a polymer/graphene composite and (b) molding process technology that creates cable tie products employing the polymer graphene composite compounded in (a) and nylon 6,6 resin.

More specifically, the present invention provides methods of preparing a cable tie including chemically functionalizing purified graphene to form a chemically functionalized graphene; dispersing the chemically functionalized graphene into a polymer matrix via a process selected from solution composition, melt composition, and in-situ composition technique to form a chemical bond with the polymer (e.g., nylon 6 molecular chain) such that a composite is formed, wherein the composite comprises graphene in an amount from 1 wt % to 20 wt %; extruding or molding the composite to form particles; melting particles with nylon 6,6 resin, and molding the cable tie, wherein the cable tie comprises graphene in an amount of between 0.01 wt % and 5 wt %. In one embodiment, the cable tie comprises graphene in an amount no greater than 1 wt %. Preferably, the chemically functionalized graphene is uniformly dispersed into the polymer matrix. In certain embodiments, the particles of composite are pellets, beads, disks, irregular geometries, or a combination of two or more thereof. In certain embodiments, the particles of composite are about 0.1 inch in size. In certain embodiments, the particles of composite are mixed with nylon 6,6 resin prior to melting. Preferably, the cable ties are formed via injection-molding using standard injection machines as are well known to a skilled artisan.

Purified graphene is chemically functionalized using methods well known to a skilled artisan. Likewise, a composite of a polymer and chemically functionalized graphene is formed using processes well known to a skilled artisan, such as solution composition, melt composition, or in-situ composition technique. Similarly, extrusion and molding techniques to form particles are well known to a skilled artisan as are molding techniques, such as injection molding, to form cable ties.

Though not meant to be limited by any theory with the subject invention, it is believed that graphene in the polymer/graphene composite acts as a reinforcing filler which improves the performance of cable ties formed therewith. While polymer cable ties, particularly cable ties made of nylon 6,6 exhibit sufficient mechanical strength for their intended purpose, cable ties formed of nylon 6,6 and a composite of graphene and nylon 6 exhibit enhanced tensile strength and elongation.

It will be appreciated by those skilled in the art that changes could be made to the embodiments described above without departing from the broad inventive concept thereof. It is understood, therefore, that this invention is not limited to the particular embodiments disclosed, but is intended to cover modifications that are within the spirit and scope of the invention, as defined by the appended claims.

What is claimed is:

1. A cable tie comprising a composite of a polymer selected from the group consisting of nylon and nylon 6 and graphene, wherein the graphene is present in the cable tie in an amount of between 0.01 wt % and 5 wt %.

2. A cable tie comprising:
   a) nylon 6,6 resin,
   b) a composite of a polymer selected from the group consisting of nylon and nylon 6, and
   c) graphene,
wherein the graphene is present in the cable tie in an amount of between 0.01 wt % and 5 wt %.

3. The cable tie of claim 1, wherein the polymer is nylon.

4. The cable tie of claim 1, wherein the polymer is nylon 6.

5. The cable tie of claim 1, wherein said graphene is chemically functionalized.

6. The cable tie of claim 1, wherein the composite comprises graphene in an amount between 1 wt % and 20 wt %.

7. The cable tie of claim 1, wherein graphene is present in the cable tie in an amount no greater than 1 wt %.

8. The cable tie of claim 1, wherein the cable tie exhibits an elongation of 20% or greater.

9. A method of preparing a cable tie according to claim 1, comprising the steps of:
   chemically functionalizing purified graphene to form a chemically functionalized graphene;
   dispersing the chemically functionalized graphene into a polymer matrix comprising nylon or nylon 6, via a process selected from a solution composition, melt composition, and in-situ composition technique such that a composite is formed, wherein the composite comprises graphene in an amount from 1 wt % to 20 wt %;
   extruding or molding the composite to form particles;
   melting particles with nylon 6,6 resin, and
   molding the cable tie, wherein the cable tie comprises graphene in an amount of between 0.01 wt % and 5 wt %.

10. The method of claim 9, wherein the cable tie comprises graphene in an amount no greater than 1 wt %.

11. The cable tie of claim 2, wherein the polymer is nylon.

12. The cable tie of claim 2, wherein the polymer is nylon 6.

13. The cable tie of claim 2, wherein said graphene is chemically functionalized.

14. The cable tie of claim 2, wherein the composite comprises graphene in an amount between 1 wt % and 20 wt %.

15. The cable tie of claim 2, wherein graphene is present in the cable tie in an amount no greater than 1 wt %.

16. The cable tie of claim 2, wherein the cable tie exhibits an elongation of 20% or greater.

17. A method of preparing a cable tie according to claim 2, comprising the steps of:
   chemically functionalizing purified graphene to form a chemically functionalized graphene;
   dispersing the chemically functionalized graphene into a polymer matrix comprising nylon or nylon 6, via a process selected from a solution composition, melt composition, and in-situ composition technique such that a composite is formed, wherein the composite comprises graphene in an amount from 1 wt % to 20 wt %;
   extruding or molding the composite to form particles;
   melting particles with nylon 6,6 resin, and
   molding the cable tie, wherein the cable tie comprises graphene in an amount of between 0.01 wt % and 5 wt %.

18. The method of claim 17, wherein the cable tie comprises graphene in an amount no greater than 1 wt %.

* * * * *